(12) United States Patent
Moll

(10) Patent No.: US 6,912,518 B1
(45) Date of Patent: Jun. 28, 2005

(54) METHODS AND SYSTEMS FOR PLANNING, SCHEDULING AND COMMUNICATING BETWEEN PLANNING AND SCHEDULING MODELS USING PROCESS CYCLES

(75) Inventor: Georges-Henri Moll, Santa Clara, CA (US)

(73) Assignee: Oracle International Corporation, Redwood Shores, CA (US)

(*) Notice: Subject to any disclaimer, the term of this patent is extended or adjusted under 35 U.S.C. 154(b) by 729 days.

(21) Appl. No.: 10/051,856

(22) Filed: Jan. 17, 2002

(51) Int. Cl.⁷ .................................................. G06N 5/00
(52) U.S. Cl. ........................................ 706/45; 188/378
(58) Field of Search .......................... 706/45; 188/378; 248/619; 310/40 R; 73/620

(56) References Cited

U.S. PATENT DOCUMENTS

| | | | | |
|---|---|---|---|---|
| 4,638,194 A | * | 1/1987 | Keefe | 310/40 R |
| 4,787,247 A | * | 11/1988 | Wuchinich et al. | 73/620 |
| 5,370,352 A | * | 12/1994 | Platus | 248/619 |
| 6,116,389 A | * | 9/2000 | Allaei | 188/378 |
| 6,394,242 B1 | * | 5/2002 | Allaei | 188/378 |

* cited by examiner

Primary Examiner—Wilbert L. Starks, Jr.
(74) Attorney, Agent, or Firm—Young Law Firm, P.C.

(57) ABSTRACT

A plan is a relaxation of the production management problem with time buckets: no precise lead times, no exact continuous balance of material. A schedule considers the full production management problem with all of the details. The present invention includes methods and systems for modeling plans and schedules and methods and systems for communicating between the planning and scheduling models. Bidirectional communication may be carried out between the planning model and the scheduling model to enable, for example, the planning model to be used as a hint during scheduling and to enable a new plan to be launched in the middle of a scheduling algorithm to update the results thereof.

42 Claims, 3 Drawing Sheets

METHODS AND SYSTEMS FOR PLANNING, SCHEDULING AND COMMUNICATING BETWEEN PLANNING AND SCHEDULING MODELS USING PROCESS CYCLES

BACKGROUND OF THE INVENTION

1. Field of the Invention

The present invention relates generally to the field of operations research and more particularly to the field of production management.

2. Description of the Related Art

The field of Operations Research (OR) is concerned with the mathematical or scientific analyses of processes and provides tools that may be used in making decisions. For example, OR provides guidance on the optimal allocation and deployment of limited resources (such as people, machines, time, materials, storage, transportation and the like) through the use of modeling and mathematical algorithms. The field of production planning and scheduling may be thought of as a subset of the field of OR and is concerned with the optimal deployment of limited resources to efficiently produce an item or items in response to an order (a request for a specified number of a specified item by a specified date). Resources may have a certain availability defined by an availability profile and a certain capacity, which may be represented by any number that represents the power (of one or more machines over time, for example) to build something. A process specifies the manner in which resources are used to produce an item. The production of the items comprising the order may be subject to a number of constraints, such as limits on manpower, machine availability, inability to produce on Sundays or most any other limit on production. Those involved with such productions use both plans and schedules to manage the long and short term production, respectively. A plan may be thought of as a long-term view of the production over predefined time quanta (herein called a time bucket T), whereas a schedule may be thought of as a shorter term set of activities necessary to achieve the desired production, albeit at a relatively lower level of granularity.

In attempting to solve complex real world problems, it is seldom possible to jump from the problem directly to a real world solution. Instead, a modeling process is used, whereby the real world problem is transformed into a mathematical problem, which is then modeled as a set of equations. The model is a set of variables and a set of constraints that define the relationship between each of the defined variables. The mathematical model may then be susceptible to being solved by one or more algorithms, leading to a mathematical solution. Such a mathematical solution may then be interpreted in light of the real world problem to arrive at the real world solution. The set of feasible solutions to such problems may be graphically represented as an n-dimensional space, where n is the number of variables in the mathematical model of the problem. Problems addressed by OR may be divided into polynomial problems and non-polynomial (hereafter, NP) problems. Problems that are classified as polynomial problems include those for which an algorithm exists (or may be devised) of polynomial complexity that solves the problem. In contrast, NP problems encompass those that are not subject to being solved by an algorithm of polynomial complexity. An important concept within the OR field is that of convexity. Convex solution domains are those in which all points on the segment joining any two points within the solution domain also belong to the solution domain. Non-convex solution domains are those in which the above statement does not hold true.

The problem of producing a schedule of activities is a non-convex problem, as well as being a NP problem. One example of such non-convexity is the problem of scheduling activities and allocating resources to such activities. For example, two or more activities may require the same resource, such as a machine tool, for example. Both activities cannot use the machine tool at the same time, which forces a decision as to which activity is to use the resource. Each decision itself may entail a number of other decisions, each of which may need to be evaluated. These decisions may be represented as a branching tree of decisions. The sheer number of such decision points often leads to a computationally unmanageable number of branching decisions, a condition also known as a combinatorial explosion. Combinatorial optimization is the sub branch of OR that addresses NP problems. Planning methodologies may be used to solve the linear relaxation of the problem and uses a time bucketing approximation and scheduling methodologies are used to solve the remaining portions of the problem.

Linear programming (hereafter, LP) methods are used to solve planning problems. LP methodologies address problems with linear equations, of the form $\Sigma a_{ij} x_j \sim b_i$, where the symbols $\geq$, $\leq$ or $=$ may be substituted for the $\sim$ symbol. Such LP problems are often solved by means of the simplex algorithm (or variations thereof), which is a matrix procedure for solving linear programs (usually to maximize or minimize a quantity known as the objective). To do so, the linear equation is placed in standard form, a so-called simplex tableau is created and the known simplex method is recursively applied to the simplex tableau until the desired maximum or minimum solution is obtained. Therefore, the generation of a plan involves finding the linear subparts of the production problem and to solve each of the linear subparts using the simplex algorithm. Non-convex problems, however, cannot be solved using the simplex algorithm.

Conventionally, therefore, LP methods are applied to the linear subparts of the scheduling problem to generate the plan. The planning model may also be characterized as a relaxation of the production problem with time buckets, which entails no precise lead times and no exact continuous balance of materials. The scheduling model, on the other hand, specifies the start and end times of each activity, identifies what resources are needed and when such resources are needed, from the raw materials to the finished product, for example.

Communication between the planning model and the scheduling model is customarily carried out through the maintenance of resource and item profiles. Such conventional communication between the planning and scheduling models, however, is awkward, as both models typically must share "constraint" objects or must each update both resource and item profiles, which are based on very different mathematical models and data structures. Such communication through "constraint" objects or through updating resource and item profiles has proven to be one of the main limitations to an efficient communication between the two models.

What are needed, therefore are methods and systems enabling a more efficient communication between the planning and scheduling models. What are also needed are methods and systems enabling the use of the plan generated through the planning model (the LP relaxation of the production problem) as a hint when generating a schedule. What are also needed are methods and systems enabling the launching of a new and updated plan in the middle of a scheduling algorithm (i.e., with only a partial schedule completed) to update the results thereof.

SUMMARY OF THE INVENTION

In accordance with the above-described objects and those that will be mentioned and will become apparent below, a method of modeling a plan, according to an embodiment of the present invention, includes steps of defining a planning process cycle decision variable $X_{(p, T)}$ to represent an amount of a process p used during a time bucket T; defining an energy per cycle variable $EPC_{(p, r)}$ to represent an amount of energy of a resource used by the process p; defining a maximum energy $E_{max(r, T)}$ variable to represent a maximum energy of the resource r that can be used during a single time bucket T, and maintaining a constraint on a product of the $X_{(p, T)}$ variable and the $EPC_{(p, r)}$ variable, summed over the process p, to be less than or equal to $E_{max(r, T)}$.

The energy per cycle variable $EPC_{(p, r)}$ is constant for a given process p and resource r. The process p produces or consumes items i and a product of $X_{(p, T)}$ and the quantity of items i produced or consumed by process p is equal to the quantity of item i produced or consumed by process p during time bucket T.

The present invention, according to another embodiment thereof, is a method of modeling a schedule, including steps of defining a scheduling process cycle decision variable $X_a$ to represent an amount of cycles used by an activity a; defining an energy per cycle variable $EPC_{p(a), r}$ to represent an amount of energy per cycle expended by a process p used by the activity a of a resource r; defining an energy $E_{a, r}$ variable to represent the energy that the activity a uses of the resource r, and maintaining equality of the $E_{a, r}$ variable and a product of the $X_a$ variable and the $EPC_{p(a), r}$ variable for all resource r.

The energy per cycle variable $EPC_{p(a), r}$ is constant for the activity a used the process p and resource r. The process p used by activity a produces or consumes items i and a product of $X_a$ and a quantity of items i produced or consumed per cycle by the process p used by the activity a is equal to a quantity of item i produced or consumed by process p used by activity a.

According to a further embodiment thereof, the present invention is a method of communicating between a plan and a schedule, including steps of modeling the plan by defining a planning process cycle decision variable $X_{(p, T)}$ to represent an amount of a process p used during a time bucket T such that a product of an energy per cycle variable $EPC_{(p, r)}$ representing an amount of energy of a resource used by the process p and the $X_{(p, T)}$ variable, summed over the process p, is less than or equal to a maximum energy $E_{max(r, T)}$ variable that represents a maximum energy of the resource r that can be used during a single time bucket T; modeling the schedule by defining a scheduling process cycle decision variable $X_a$ to represent an amount of cycles used by an activity a such that a product of an energy per cycle variable $EPC_{p(a), r}$ representing an amount of energy per cycle expended by a process p used by the activity a of a resource r, over all resource r, is equal to an energy $E_{a, r}$ variable that represents the energy that the activity a uses of the resource r, and attempting to maintain equality between values of $X_{(p, T)}$ and values of $X_a$ that occur during a time bucket T, summed across all time buckets T and across all activities a that use the process p.

The value of $X_a$ that occurs during the time bucket T is the product of $X_a$ and $\underline{d(T \cap a)}/d(a)$. $X^0_{(p, T)}$ represents a recommendation from the planning model and $X^A_{(p, T)}$ represents a contribution to $X_{(p, T)}$ of a set A of activities scheduled so far and the next process p to schedule may be selected based upon the recommendation $X^0_{(p, T)}$, the selected next process p maximizing the difference between the value of the $X^0_{(p, T)}$ variable and the value of the $X^A_{(p, T)}$ variable. Slack variable $X^R_{(p, T)}$ is defined as the difference between $X^0_{(p, T)}$ and $X^A_{(p, T)}$ and $X^R_{(p, T)}(K)$ is a sum of the slack variables $X^R_{(p, T)}$ over a number K of time buckets, and the next process to schedule may be selected so as to minimize a number K(p) that is defined such that $X^R_{(p, T)}(K-1) \leq Q_{(i, t)}/QPC_{(p, i)} \leq X^R_{(p, T)}(K)$ is true. The next activity a that uses process p may be selected by attempting to schedule each process p and independently scheduling activity a that corresponds to the attempted scheduled process p and by selecting the attempted scheduled process p or activity a that that does not exceed $X^0_{(p, T)}$ and has the minimum duration. A step may be carried out to update $X^0_{(p, T)}$ to obtain $X^{new}_{(p, T)}$ and to use $X^{new}_{(p, T)}$ instead of $X^0_{(p, T)}$ when $X^A_{(p, T)} > X^0_{(p, T)}$ for some (p, T). $X^A_{(p, T)}$ represents a contribution to $X_{(p, T)}$ of a set A of activities scheduled so far and the plan modeling step may be carried out with an additional constraint of a defined upper bound of $X_{(p, T)} > X^A_{(p, T)}$. If at any point $X^A_{(p, T)} \geq X^0_{(p, T)}$, the method may include carrying out a backtracking step in which the last process p in the schedule is unscheduled until $X^0_{(p, T)} \geq X^A_{(p, T)}$, or an updating step to update $X^0_{(p, T)}$ to obtain $X^{new}_{(p, T)}$ and determining whether $X^{new}_{(p, T)} \geq X^A_{(p, T)}$ holds true.

According to still further embodiments, the present invention also includes computer systems and computer-readable media that are configured to carry out and store code for carrying out the above-described functionality, respectively.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE INVENTION

Functional Description

I. Simplified Planning Model

A The present invention includes a simplified LP (planning) model that facilitates communication between the planning model and the scheduling model. According to the present invention, a process p may be defined as a production mechanism that consumes items, produces items and consumes energy of a resource or resources r. There is a maximum energy $E_{max(r, T)}$ that may be consumed by resource r during time bucket T. Such maximum energy may be expressed in watts, but may also be expressed in other units, such as machine days, machine minutes or machine hours, for example. The time bucket T represents the limit of the linear relaxation of the production problem and represents the lowest level of time granularity of the planning model. The capacity profile of the resource r inside the time bucket T is unknown. Process p represents a recipe for building an item or items and uses resources r, which may be or include human(s) and/or machines. According to the present invention, how much this process p is used during a single time bucket T is represented by an abstract number called planning process cycles $X_{(p, T)}$. The value of the $X_{(p, T)}$ variable, therefore, represents the amount of a process p that is used during a time bucket T. The resulting energy consumed by the process p during a time bucket T, as well as the items consumed or produced are directly proportional to this number of planning process cycles $X_{(p, T)}$. Indeed, the proportionality coefficient for the energy consumed may be denoted by an Energy Per Cycle constant $EPC_{(p, r)}$ (constant for a given process and resource) and the proportionality coefficient for the items consumed or produced may be denoted by the Quantity Per Cycle constant $QPC_{(p, i)}$ (constant for a given process and item), which is positive for items produced and negative for items consumed. The $QPC_{(p, i)}$ constant may, for example, represent the number of tires, gallons of gasoline, pounds of flour or any other resource.

Figure 1:
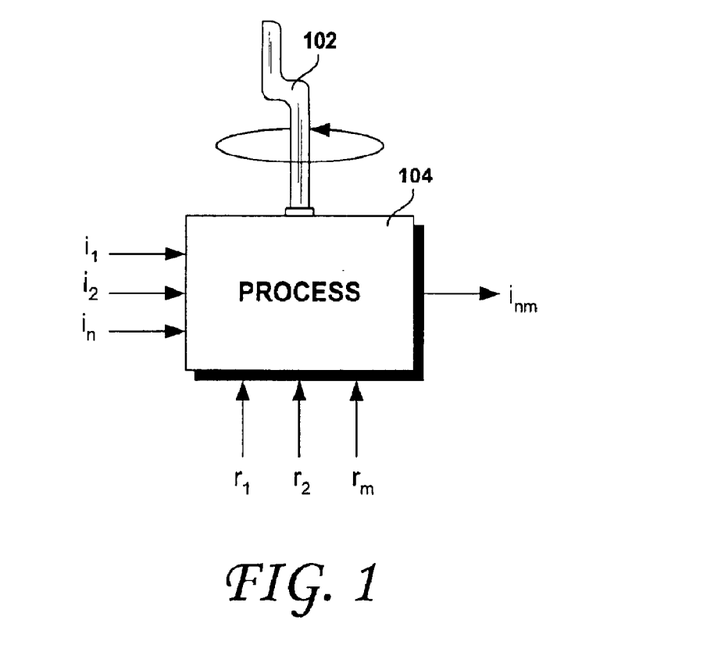
FIG. 1 shows a metaphor for the process cycles $X_{(p, T)}$ decision variable, according to an embodiment of the present invention.

The planning process cycles variable $X_{(p, T)}$ may be likened to the crankshaft shown in FIG. 1. As shown therein, a crankshaft 102 is connected to process 104. For each turn of this metaphorical crankshaft 102, the process 104 consumes items $i_1$ through $i_n$, resources $r_1$ through $r_m$ and produces item $i_{mn}$. The quantity of items produced by process 104 for each turn of the crankshaft 102 is quantified by the variable $QPC_{(p, i)}$. The amount of energy used for this process during a single time bucket T is constrained by the above-described maximum energy $E_{max(r, T)}$, which is the maximum energy of resource r that can be used during a single time bucket T. The product of the process cycles variable $X_{(p, T)}$ and the Energy Per Cycle constant $EPC_{(p, r)}$ summed over the process p must, therefore, be subject to the constraint of being less or equal to the $E_{max(r, T)}$ variable, for all T. Stated more formally, $$\Sigma_p X_{(p, T)} * EPC_{(p, r)} \leq E_{max(r, T)} \qquad \text{Eqn. 1}$$

The value of the product of the $QPC_{(p, i)}$ variable (which denotes the amount of items i produced or consumed by process p) and the planning process cycles variable $X_{(p, T)}$ represents the quantity of items i produced or consumed during time bucket T. In other words, the product represents the number of items i produced or consumed by process p during a single time bucket T in response to a single turn of the metaphorical crankshaft 102.

The product of the process cycles variable $X_{(p, T)}$ and the $EPC_{(p, r)}$ variable is equal to the energy consumed by process p of resource r during time bucket T or $E_{(p, r), T}$, for all resources r. Therefore, $$\forall r, X_{(p, T)} * EPC_{(p, r)} = E_{(p, r), T} \qquad \text{Eqn. 2}$$

Similarly, the product of the process cycles variable $X_{(p, T)}$ and the $QPC_{(p, i)}$ variable is equal to the quantity of item i consumed (if negative) or produced (if positive) by process p during time bucket T or $Q_{(p, i), T}$, for all items i, or $$\forall i, X_{(p, T)} * QPC_{(p, i)} = Q_{(p, i), T} \qquad \text{Eqn. 3}$$

II. Simplified Scheduling Model

The present invention also includes a simplified scheduling model that facilitates communication between the planning model and the scheduling model. On the scheduling side, the variable a represents an activity (an activity a may be thought of as an operation that uses one or more resources) that has a start time s(a), an end time e(a) and a duration d(a), the latter being mathematically defined as d(a)=e(a)−s(a). Note that the scheduling model is not concerned with time buckets T but is concerned with fully scheduled start times, end times and durations of activities. The duration of the activities may be measured to any level of precision needed such as, for example, minutes, hours, minutes or days. An activity a may be associated with a process, which association may be represented as p(a). The capacity C that an activity a uses of a resource r over time may be denoted as $C_{(a, r)}$. It is to be noted that an activity a may use more than one resource r simultaneously, such as is the case wherein both a machine (a first resource) and an operator (a second resource) are used to produce an item. Energy is used in carrying out an activity a on a resource r. Such energy $E_{(a, r)}$ may be defined as the product of the duration d(a) and the capacity $C_{(a, r)}$ that the activity a uses of the resource r. Therefore, $$E_{(a, r)} = d(a) * C_{(a, r)}. \qquad \text{Eqn. 4}$$

During manufacturing, materials may flow from one activity a1 to another activity a2. A variable $Qi_{(a1, a2)}$ may be defined to represent the quantity of an item i flowing from activity a1 to activity a2. The term "pegging", in this regard, denotes a graph of material flow from one activity to another, according to a;preset schedule. Determining a feasible (and hopefully optimal) flow of materials from one activity to another and determining a schedule of activities is one of the complex problems that the field of production management seeks to address.

The present invention also defines a scheduling analogue to the planning process cycles $X_{(p, T)}$ defined for the present planning model. That is, the present invention introduces a simplified scheduling model making use of a scheduling process cycles variable $X_a$ that represents the number of cycles used by activity a. According to the present invention, the variable $X_a$ is such that the product of $X_a$ and $EPC_{p(a), r}$ is equal to $E_{a, r}$ for all resources r. The Energy Per Cycle variable $EPC_{p(a), r}$ represents the energy expended by the process used by activity a of the resource r. The $E_{a, r}$ variable represents the energy that activity a uses of resource r. Mathematically, this relationship may be expressed as follows:

$$\forall r, X_a * EPC_{p(a), r} = E_{a, r} \qquad \text{Eqn. 5}$$

Equation 5 is the scheduling counterpart to planning model Equation 2 above. Similarly, the product of $X_a$ and $QPC_{p(a), i}$ is equal to $Q_{ai}$ for all items i. The Quantity Per Cycle variable $QPC_{p(a), i}$ represents the quantity of items i consumed (if negative) or produced (if positive) per cycle by the process p used by activity a. The value of the $Q_{ai}$ variable represents the quantity of items i that the activity a produces (when positive) or consumes (when negative). Stated mathematically, $$\forall i, X_a * QPC_{p(a), i} = Q_{a, i} \qquad \text{Eqn. 6}$$

which equation is the scheduling counterpart to planning model Equation 3 above. The $X_a$ variable, the $EPC_{p(a), r}$ variable, the $E_{a, r}$ variable, the $QPC_{p(a), i}$ variable and the $Q_{a, i}$ variable are subject to constraints (such as, for example, resource profiles, flow of materials and the like), which are dealt with by the scheduling algorithm. If the scheduling algorithm is Constraint Programming—(CP) based, those constraints are managed through propagation. Otherwise, the constraints may be managed by the maintenance of resource and item profiles (repair based or local search, for example).

Figure 2:
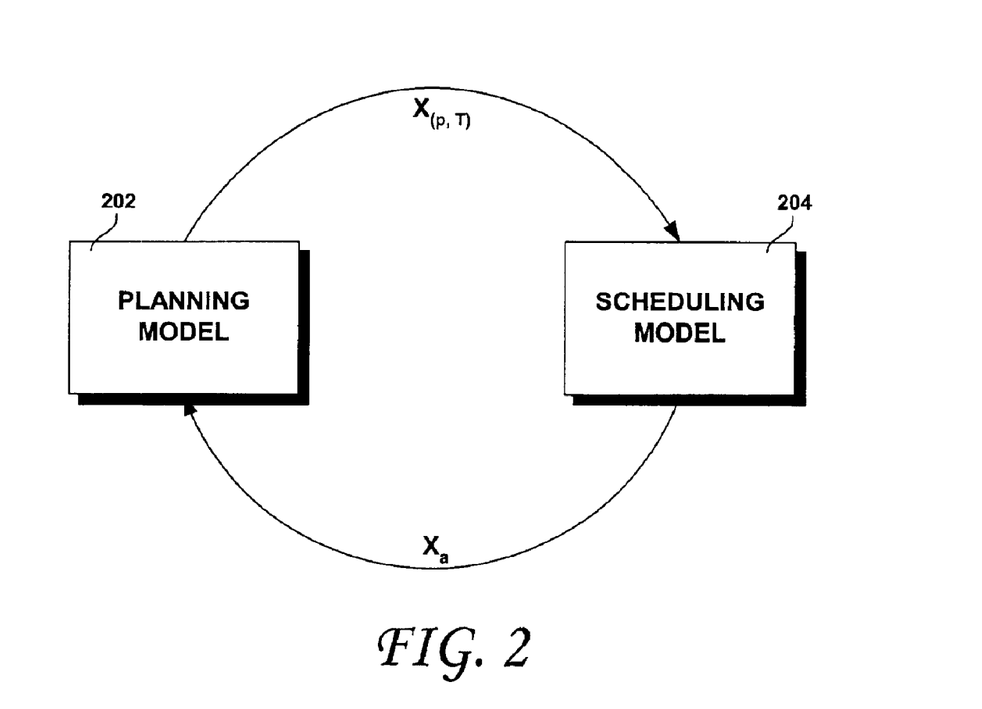
FIG. 2 shows the communication between the planning model and the scheduling model, according to the present invention.

III. Communication Between the Present Planning Model and the Present Scheduling Model In contradistinction to conventional methods wherein the energy expended of resources r (through resource profiles) are used to communicate between the planning and scheduling models (i.e., $E_{max(r, T)}$ and $E_{(a, r)}$), according to the present invention, the communication between the planning model 202 and the scheduling model 204 is carried out via the $X_{(p, T)}$ and $X_a$ process cycle decision variables, as represented in FIG. 2. Any scheduling model may be used within the context of the present invention, as long as the scheduling model is constructive, meaning that at any point during the algorithm, there exists a set of scheduled activities a for which the start time s(t), end time e(t), and capacity $C_{(a, r)}$ are decided.

Figure 3:
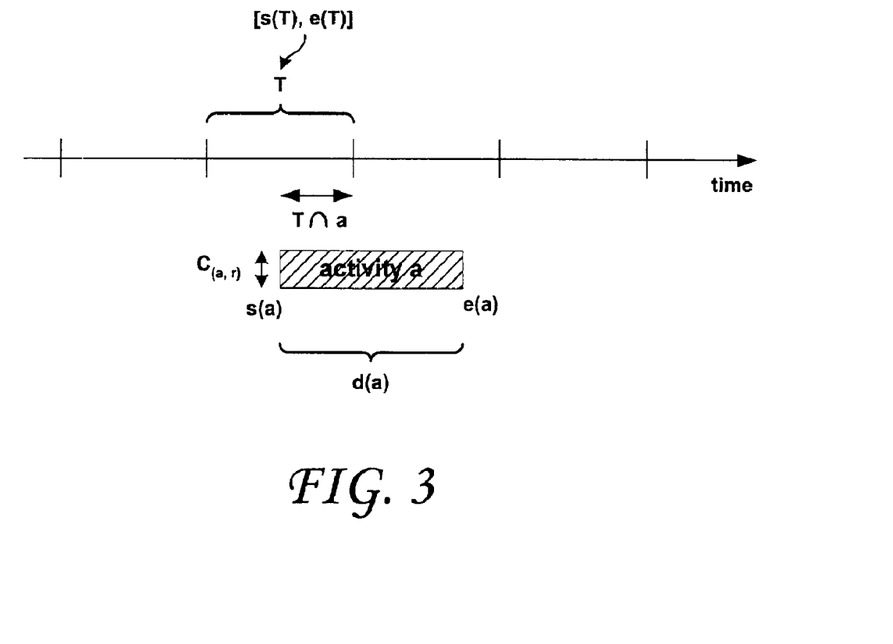
FIG. 3 illustrates an aspect of the communication between the planning and scheduling model, according to an embodiment of the present invention.

To enable communication between the planning and scheduling models 202, 204 through the $X_{(p, T)}$ and $X_a$ process cycle decision variables, it is necessary to define their semantic relationship and to establish a communication protocol that respects this semantic relationship. FIG. 3 shows a graphical representation of the relation of the $X_{(p, T)}$ and the $X_a$ decision variables, according to an embodiment of the present invention. With reference to FIG. 3, the time bucket T and the activity a may be considered as intervals. A portion of the scheduling process cycles $X_a$ occurs during the interval T. Specifically, Xa occurs within time bucket T for a duration equal to d(T∩a). Therefore, the number of scheduling process cycles $X_a$ occurring during time bucket T is $X_a * d(T \cap a)/d(a)$, assuming a constant speed of production during the time bucket T. This expression represents the number of scheduling process cycles used by activity a during time bucket T. Of course, activities may span several time buckets. Moreover, the start and end times of the activities may not coincide with time bucket boundaries (mostly they will not). It follows that if the scheduling process cycles $X_a$ are summed across all time buckets T ($\forall T$) and all activities that use the process p ($\forall p$), the $X_{(p, T)}$ variable will emerge. Stated mathematically, $$\forall T, \forall p, X_{(p,T)} = \Sigma_{\{a|p(a)=p\}} Xa * \frac{d(T \cap a)}{d(a)} \qquad \text{Eqn. 7}$$

Equation 7 represents the semantic link between the planning model and the scheduling model, using the planning process cycles and the scheduling process cycles decision variables defined herein. According to the present invention, equation 7 is preferably satisfied after both planning and scheduling models have been run. In communicating between planning and scheduling models, the $X_a$ and $X_{(p, T)}$ variables should be kept consistent (or as consistent as practicable); that is, respecting equation 7.

1. Communication from the Present Planning Model to the Present Scheduling Model It is assumed here that the planning algorithm has run and has given recommended values $X^0_{(p, T)}$ to the $X_{(p, T)}$ variables. It is also assumed that the scheduling algorithm has also partially run and has generated a set A of activities scheduled so far, meaning that the scheduling algorithm has assigned values to the start time, the end time, the duration and the capacity $C_{(a, r)}$ to all activities within the set A of activities scheduled so far. That the scheduling algorithm is constructive is the only condition placed thereon. Let $X^A_{(p, T)}$ represent the contribution to the planning process cycles variable $X_{(p, T)}$ of the activities A scheduled so far. Expressing equation 7 in terms of the $X^A_{(p, T)}$ variable yields:

$$X^A_{(p,T)} = \Sigma_{\{a \in A | p(a)=p\}} X_a * \frac{d(T \cap a)}{d(a)} \qquad \text{Eqn. 8}$$

That is, the contribution $X^A_{(p, T)}$ to the planning process cycles variable $X_{(p, T)}$ of the activities A scheduled so far may be calculated by summing, across all activities scheduled so far that use the process p, the number of scheduling process cycles $X_a$ that occurring during time bucket T. As not all activities a have been scheduled by the scheduling algorithm, it is hoped that the recommendation from the planning algorithm $X^0_{(p, T)}$ is greater than or equal to the planning process cycles variable $X^A_{(p, T)}$ of the activities A scheduled so far. That is, it is hoped that $$X^0_{(p, T)} \geq X^A_{(p, T)} \qquad \text{Eqn. 9}$$

The goal here is to enable the scheduling algorithm to decide what further activities a to schedule, based upon what process p and for how many scheduling process cycles $X_a$. For example, the scheduling algorithm may be in a backward phase and must satisfy an end demand (an order) or a non-end demand (an intermediate item) quantity of items $Q_{(i, t)}$, the quantity of item i to produce for time t. Let P be the set of all candidate processes that produce item i to satisfy demand $Q_{(i, t)}$:

$$P = \{p | QPC_{(p, i)} > 0\} \qquad \text{Eqn. 10}$$

The $QPC_{(p, i)}$ quantity is positive when the process produces item i, negative when the process consumes item i and equal to zero when the process does not produce or consume item i.

The following non-limiting examples illustrate some of manners in which the next process p may be chosen by the scheduling algorithm, according to embodiments of the present invention.

EXAMPLE 1

Figure 4:
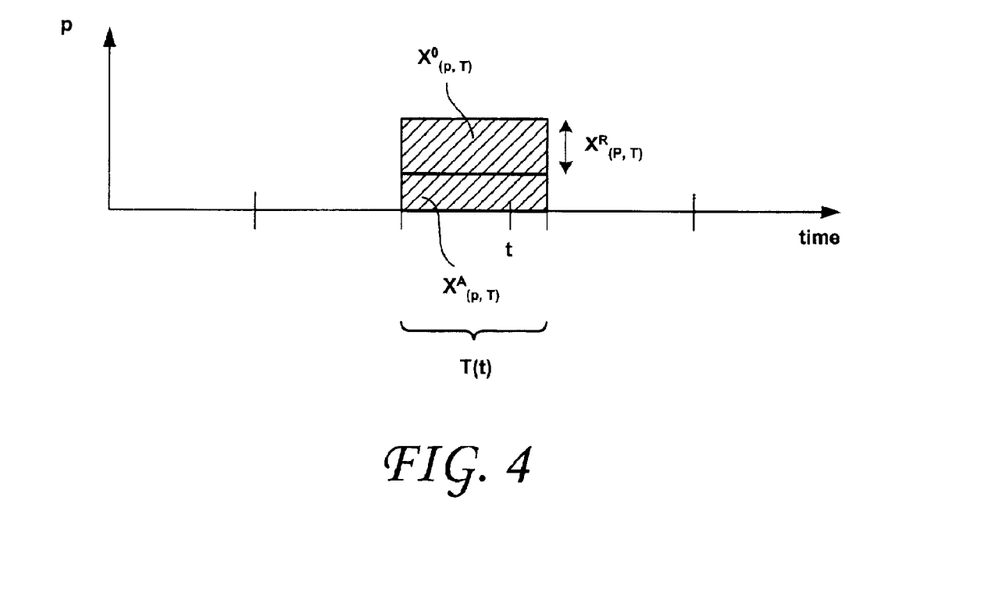
FIG. 4 illustrate an exemplary method of choosing the next process based upon a recommendation from the planning algorithm, according to an embodiment of the present invention.

FIG. 4 illustrate an exemplary method of choosing the next scheduling process based upon a recommendation from the planning algorithm, according to an embodiment of the present invention. As shown therein, the value of $X^A_{(p, T)}$ from the scheduling algorithm does not reach the value of the recommendation from the planning algorithm $X^0_{(p, T)}$. As shown, $X^0_{(p, T)} >= X^A_{(p, T)}$. Converting this inequality into an equality may be carried out by adding a slack variable to the left hand side of the inequality. The value of such a slack variable is numerically equal to the difference between the left and right hand sides of the inequality. A solution to this scheduling problem, is to choose the process p that maximizes the difference between the value of the $X^0_{(p, T)}$ variable and the value of the $X^A_{(p, T)}$ variable. This difference is shown as slack variable $X^R_{(p, T)}$ in FIG. 4. Therefore, $X^0_{(p, T)} = X^R_{(p, T)}$. The slack variable $X^R_{(p, T)}$ represents the remaining scheduling process cycles not yet scheduled. The time bucket T that contains the time t is shown in FIG. 4 by T(t). Such a maximum value may be negative because the scheduling algorithm may overrule the planning algorithm, when appropriate.

EXAMPLE 2

As shown in FIG. 4 and example 1 above, $X^0_{(p, T)} - X^A_{(p, T)} = X^R_{(p, T)}$. Assuming, for example, that the scheduling algorithm is in a backward phase, the number of scheduling cycles not yet scheduled may be determined, for time buckets T, T-1, T-2, . . . T-K, where K is an abstract number of time buckets T. In other words, it is not known how many time buckets the activity will occupy. To determine this, we sum the slacks $X^R_{(p, T)}$ over the K time buckets, as follows:

$$X^R_{(p, T)}(K) = \Sigma_{K=0}{}^K X^R_{(p, T(t)-K)} \qquad \text{Eqn. 11}$$

Given a process p, we can predict what number of scheduling process cycles $X_a$ that are needed to complete activity a. Indeed, $X_a = Q_{(i, t)}/QPC_{(p, i)}$, where $Q_{(i, T)}$ represents the number of items i produced or consumed by time t and where $QPC_{(p, i)}$ represents the number of items i produced or consumed by scheduling machine cycle. It is now possible to determine the upper and lower bounds for the abstract K variable. Indeed, for a given p and a, there is only one K such that the following inequality holds:

$$X^R_{(p, T)}(K-1) \leq Q_{(i, t)}/QPC_{(p, i)} \leq X^R_{(p, T)}(K) \qquad \text{Eqn. 12}$$

Such a number may be called K(p). Therefore, the K(p) represents a lower bound of the number of time buckets actually needed for the activity a that uses process p. The solution to the scheduling problem, in this case, is to choose p that minimizes K(p). As is seen herein, the present invention enables updates to the schedule produced by the scheduling algorithm without regard to the availability, production and/or consumption of resources used by process p, as is conventionally necessary.

EXAMPLE 3

The third example utilizes a brute force approach to choosing the next activity a that uses process p. The approach here is to try all processes p and independently schedule corresponding activity a. Thereafter, the solution is to choose the process p or activity a that has the minimum duration d(a) that does not exceed the recommendation $X^0_{(p, T)}$ from the planning model, for the relevant T. More precisely, $$\forall T | T \cap a \neq \emptyset; X^0_{(p, T)} - X^{A \cup \{a\}}_{(p, T)} \geq 0, \qquad \text{Eqn. 13}$$

where the ∩ symbol is the "union" operator and wherein the ∅ symbol designates the empty set. Stated differently, for all time buckets T in which the activity a occurs, the recommendation from the planning model $X^0_{(p, T)}$ is compared to scheduling process cycles of the activities A scheduled so far together with the activity a to be scheduled. Then, the activity that fits equation 12 that has the minimum duration d(a) is chosen. It is possible, however, that such a process p does not exist, and another activity choosing strategy may have to be employed.

2. Communication from the Scheduling Model to the Planning Model

At any time, the recommendation $X^0_{(p, T)}$ from the planning model may be updated and a new recommendation, say $X^{new}_{(p, T)}$ produced and used instead of the previous recommendation, in any of the examples described herein. This is needed only if $X^A_{(p, T)} > X^0_{(p, T)}$ for some (p, T).

To do so, the scheduling process cycles $X^A_{(p, T)}$ for all activities A scheduled so far are calculated, as described herein above. Then, the (linear programming) planning algorithm is launched, with the additional constraint of a defined upper bound of $X_{(p, T)} \geq X^A_{(p, T)}$. The new solution $S_{new} = \{X^{new}_{(p, T)}\}_{(p, T)}$ is an update of the planning model recommendation that incorporates the constraints of the activities A already scheduled. If, at any point during the scheduling of activities $X^A_{(p, T)} \geq X^0_{(p, T)}$, then two choices may be available. First, the last process p in the schedule may be backtracked (unscheduled) until $X^0_{(p, T)} \geq X^A_{(p, T)}$ or the planning algorithm may be launched again to update the recommendation $X^0_{(p, T)}$ and determine if the new recommendation from the planning model $X^{new}_{(p, T)}$ is indeed greater or equal to $X^A_{(p, T)}$.

Note that the planning model can fail. An LP slack variable/goal programming technique may be useful in determining what process and what time bucket is the problem. The faulty activity or activities may then be identified and unscheduled.

3. Bidirectional Communication Between Scheduling and Planning Models

The communications from the planning to the scheduling models and from the scheduling to the planning models described herein may be implemented at whatever frequency may be required. The frequency of such communications may be determined, for example, by a certain number of activities scheduled so far, saturation of resources or any other tactic. The present invention is independent of the technology of the scheduling algorithm, provided that the scheduling algorithm is constructive.

Hardware Description

Figure 5:
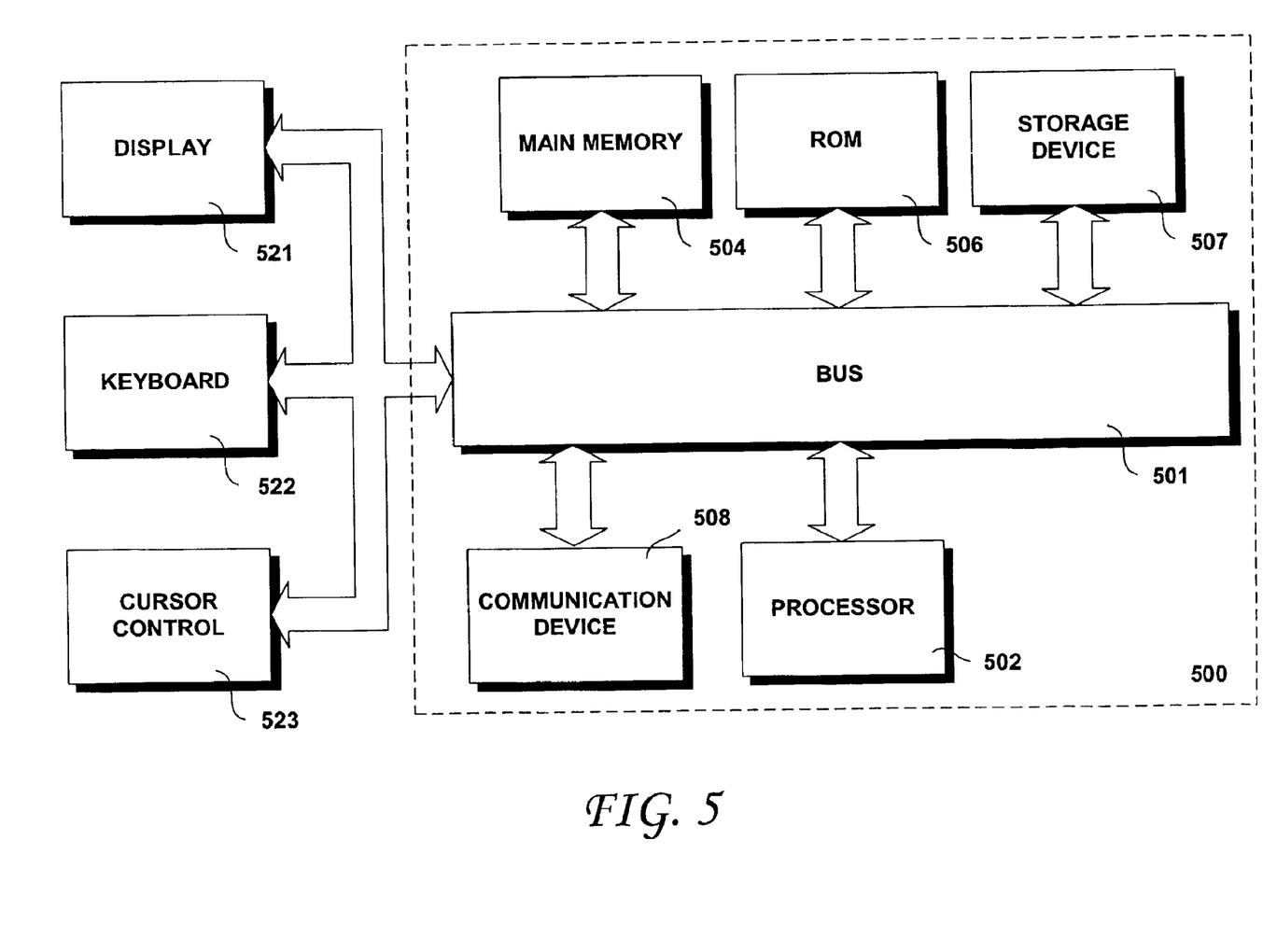
FIG. 5 is a diagram of a computing device with which the present invention may be practiced.

FIG. 5 illustrates a block diagram of a computing device 500 with which an embodiment of the present invention may be implemented. Computing device 500 includes a bus 501 or other communication mechanism for communicating information, and a processor 502 coupled with bus 501 for processing information. Computing device 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computing device 500 may also include a read only memory (ROM) and/or other static storage device 506 coupled to bus 501 for storing static information and instructions for processor 502. A data storage device 507, such as a magnetic disk or optical disk, may be coupled to bus 501 for storing information and instructions. A communication device 508, such as a modem or network (such as Ethernet, for example) card may also coupled to the bus 501 to provide access to a network, such as the Internet, for example.

The computing device 500 may also be coupled via bus 501 to a display device 521, such as a cathode ray tube (CRT), for displaying information to a computer user. An alphanumeric input device 522, including alphanumeric and other keys, is typically coupled to bus 501 for communicating information and command selections to processor 502. Another type of user input device may be the user's own voice or cursor control 523, such as a mouse, a trackball, or cursor direction keys for communicating direction information and command selections to processor 502 and for controlling cursor movement on display 521.

The present invention is related to the use of computing device 500 for modeling plans and schedules, as well as for communicating between plans and schedules as described herein. According to one embodiment, the processing may be carried out by one or more computing devices 500 in response to processor(s) 502 executing sequences of instructions contained in memory 504. Such instructions may be read into memory 504 from another computer-readable medium, such as data storage device 507 and/or from a remotely located server. Execution of the sequences of instructions contained in memory 504 causes processor(s) 502 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method of modeling a plan, comprising the steps of:
defining a planning process cycle decision variable $X_{(p, T)}$ to represent an amount of a process p used during a time bucket T;
defining an energy per cycle variable $EPC_{(p, r)}$ to represent an amount of energy of a resource used by the process p;
defining a maximum energy $E_{max(r, T)}$ variable to represent a maximum energy of the resource r that can be used during a single time bucket T, and
maintaining a constraint on a product of the $X_{(p, T)}$ variable and the $EPC_{(p, r)}$ variable, summed over the process p, to be less than or equal to $E_{max(r, T)}$.

2. The method of claim 1, wherein the energy per cycle variable $EPC_{(p, r)}$ is constant for a given process p and resource r.

3. The method of claim 1, wherein the process p produces or consumes items i and wherein a product of $X_{(p, T)}$ and a quantity of items i produced or consumed by process p is equal to a quantity of item i produced or consumed by process p during time bucket T.

4. A method of modeling a schedule, comprising the steps of:
defining a scheduling process cycle decision variable $X_a$ to represent an amount of cycles used by an activity a;
defining an energy per cycle variable $EPC_{p(a), r}$ to represent an amount of energy per cycle expended by a process p used by the activity a of a resource r;
defining an energy $E_{a, r}$ variable to represent the energy that the activity a uses of the resource r, and
maintaining equality of the $E_{a, r}$ variable and a product of the $X_a$ variable and the $EPC_{p(a), r}$ variable for all resource r.

5. The method of claim 4, wherein the energy per cycle variable $EPC_{p(a), r}$ is constant for the activity a used the process p and resource r.

6. The method of claim 1, wherein the process p used by activity a produces or consumes items i and wherein a product of $X_a$ and a quantity of items i produced or consumed per cycle by the process p used by the activity a is equal to a quantity of item i produced or consumed by process p used by activity a.

7. A method of communicating between a plan and a schedule, comprising the steps of:
modeling the plan by defining a planning process cycle decision variable $X_{(p, T)}$ to represent an amount of a process p used during a time bucket T such that a product of an energy per cycle variable $EPC_{(p, r)}$ representing an amount of energy of a resource used by the process p and the $X_{(p, T)}$ variable, summed over the process p, is less than or equal to a maximum energy $E_{max(r, T)}$ variable that represents a maximum energy of the resource r that can be used during a single time bucket T;
modeling the schedule by defining a scheduling process cycle decision variable $X_a$ to represent an amount of cycles used by an activity a such that a product of an energy per cycle variable $EPC_{p(a), r}$ representing an amount of energy per cycle expended by a process p used by the activity a of a resource r, over all resource r, is equal to an energy $E_{a, r}$ variable that represents the energy that the activity a uses of the resource r, and
attempting to maintain equality between values of $X_{(p, T)}$ and values of $X_a$ that occur during a time bucket T, summed across all time buckets T and across all activities a that use the process p.

8. The method of claim 7, wherein a value of $X_a$ that occurs during the time bucket T is a product of $X_a$ and $d(T \cap a)/d(a)$.

9. The method of claim 7, wherein $X^0_{(p, T)}$ represents a recommendation from the planning model and $X^A_{(p, T)}$ represents a contribution to $X_{(p, T)}$ of a set A of activities scheduled so far and wherein the method further comprises a step of selecting a next process p to schedule based upon the recommendation $X^0_{(p, T)}$, the selected next process p maximizing a difference between a value of the $X^0_{(p, T)}$ variable and a value of the $X^A_{(p, T)}$ variable.

10. The method of claim 7, wherein $X^0_{(p, T)}$ represents a recommendation from the planning model, $X^A_{(p, T)}$ represents a contribution to $X_{(p, T)}$ of a set A of activities scheduled so far, slack variable $X^R_{(p, T)}$ is defined as a difference between $X^0_{(p, T)}$ and $X^A_{(p, T)}$, and $X^R_{(p, T)}(K)$ is a sum of the slack variables $X^R_{(p, T)}$ over a number K of time buckets, and wherein a next process to schedule is selected so as to minimize a number K(p) that is defined such that $X^R_{(p, T)}(K-1) \leq Q_{(i, t)}/QPC_{(p, i)} \leq X^R_{(p, T)}(K)$ is true.

11. The method of claim 7, wherein $X^0_{(p, T)}$ represents a recommendation from the planning model, and wherein a next activity a that uses process p is selected by attempting to schedule each process p and independently scheduling activity a that corresponds to the attempted scheduled process p and by selecting the attempted scheduled process p or activity a that that does not exceed $X^0_{(p, T)}$ and has a minimum duration.

12. The method of claim 7, wherein $X^0_{(p, T)}$ represents a recommendation from the planning model and wherein the method further comprises a step of updating $X^0_{(p, T)}$ to obtain $X^{new}_{(p, T)}$ and using $X^{new}_{(p, T)}$ instead of $X^0_{(p, T)}$ when $X^A_{(p, T)} > X^0_{(p, T)}$ for some (p, T).

13. The method of claim 12, wherein $X^A_{(p, T)}$ represents a contribution to $X_{(p, T)}$ of a set A of activities scheduled so far and wherein the plan modeling step is carried out with an additional constraint of a defined upper bound of $X_{(p, T)} > X^A_{(p, T)}$.

14. The method of claim 13, wherein if at any point $X^A_{(p, T)} \geq X^0_{(p, T)}$, the method includes carrying out:
a backtracking step wherein a last process p in the schedule is unscheduled until $X^0_{(p, T)} \geq X^A_{(p, T)}$, or
an updating step to update $X^0_{(p, T)}$ to obtain $X^{new}_{(p, T)}$ and to determine whether $X^{new}_{(p, T)} \geq X^A_{(p, T)}$ holds true.

15. A computer system configured for modeling a plan, comprising:
at least one processor;
at least one data storage device;

a plurality of processes spawned by said at least one processor, the processes including processing logic for:

defining a planning process cycle decision variable $X_{(p, T)}$ to represent an amount of a process p used during a time bucket T;

defining an energy per cycle variable $EPC_{(p, r)}$ to represent an amount of energy of a resource used by the process p;

defining a maximum energy $E_{max(r, T)}$ variable to represent a maximum energy of the resource r that can be used during a single time bucket T, and maintaining a constraint on a product of the $X_{(p, T)}$ variable and the $EPC_{(p, r)}$ variable, summed over the process p, to be less than or equal to $E_{max(r, T)}$.

16. The computer system of claim 15, wherein, the energy per cycle variable $EPC_{(p, r)}$ is constant for a given process p and resource r.

17. The computer system of claim 15, wherein the process p produces or consumes items i and wherein a product of $X_{(p, T)}$ and a quantity of items i produced or consumed by process p is equal to a quantity of item i produced or consumed by process p during time bucket T.

18. A computer system configured for modeling a schedule, comprising:

at least one processor;

at least one data storage device;

a plurality of processes spawned by said at least one processor, the processes including processing logic for:

defining a scheduling process cycle decision variable $X_a$ to represent an amount of cycles used by an activity a;

defining an energy per cycle variable $EPC_{p(a), r}$ to represent an amount of energy per cycle expended by a process p used by the activity a of a resource r;

defining an energy $E_{a, r}$ variable to represent the energy that the activity a uses of the resource r, and maintaining equality of the $E_{a, r}$ variable and a product of the $X_a$ variable and the $EPC_{p(a), r}$ variable for all resource r.

19. The computer system of claim 18, wherein, the energy per cycle variable $EPC_{p(a), r}$ is constant for the activity a used the process p and resource r.

20. The computer system of claim 18, wherein the process p used by activity a produces or consumes items i and wherein a product of $X_a$ and a quantity of items i produced or consumed per cycle by the process p used by the activity a is equal to a quantity of item i produced or consumed by process p used by activity a.

21. A computer system configured for communicating between a plan and a schedule, comprising:

at least one processor, at least one data storage device;

a plurality of processes spawned by said at least one processor, the processes including processing logic for:

modeling the plan by defining a planning process cycle decision variable $X_{(p, T)}$ to represent an amount of a process p used during a time bucket T such that a product of an energy per cycle variable $EPC_{(p, r)}$ representing an amount of energy of a resource used by the process p and the $X_{(p, T)}$ variable, summed over the process p, is less than or equal to a maximum energy $E_{max(r, T)}$ variable that represents a maximum energy of the resource r that can be used during a single time bucket T;

modeling the schedule by defining a scheduling process cycle decision variable $X_a$ to represent an amount of cycles used by an activity a such that a product of an energy per cycle variable $EPC_{p(a), r}$ representing an amount of energy per cycle expended by a process p used by the activity a of a resource r, over all resource r, is equal to an energy $E_{a, r}$ variable that represents the energy that the activity a uses of the resource r, and attempting to maintain equality between a value of $X_{(p, T)}$ and a value of $X_a$ that occurs during a time bucket T, summed across all time buckets T and across all activities a that use the process p.

22. The computer system of claim 21, wherein a value of $X_a$ that occurs during the time bucket T is a product of $X_a$ and $d(T \cap a)/d(a)$.

23. The computer system of claim 21, wherein $X^0_{(p, T)}$ represents a recommendation from the planning model and $X^A_{(p, T)}$ represents a contribution to $X_{(p, T)}$ of a set A of activities scheduled so far and wherein the computer systems is configured to select a next process p to schedule based upon the recommendation $X^0_{(p, T)}$, the selected next process p maximizing a difference between a value of the $X^0_{(p, T)}$ variable and a value of the $X^A_{(p, T)}$ variable.

24. The computer system of claim 21, wherein $X^0_{(p, T)}$ represents a recommendation from the planning model, $X^A_{(p, T)}$ represents a contribution to $X_{(p, T)}$ of a set A of activities scheduled so far, slack variable $X^R_{(p, T)}$ is defined as a difference between $X^0_{(p, T)}$ and $X^A_{(p, T)}$, and $X^R_{(p, T)}(K)$ is a sum of the slack variables $X^R_{(p, T)}$ over a number K of time buckets, and wherein the computer system is configured to schedule a next process p so as to minimize a number K(p) that is defined such that $X^R_{(p, T)}(K-1) \leq Q_{(i, t)}/QPC_{(p, i)} \leq X^R_{(p, T)}(K)$ is true.

25. The computer system of claim 21, wherein $X^0_{(p, T)}$ represents a recommendation from the planning model, and wherein the computer system is configured to select a next activity a that uses process p by attempting to schedule each process p and independently scheduling activity a that corresponds to the attempted scheduled process p and by selecting the attempted scheduled process p or activity a that that does not exceed $X^0_{(p, T)}$ and has a minimum duration.

26. The computer system of claim 21, wherein $X^0_{(p, T)}$ represents a recommendation from the planning model and wherein the computer system is further configured to carry out a step of updating $X^0_{(p, T)}$ to obtain $X^{new}_{(p, T)}$ and using $X^{new}_{(p, T)}$ instead of $X^0_{(p, T)}$ when $X^A_{(p, T)} > X^0_{(p, T)}$ for some (p, T).

27. The computer system of claim 26, wherein $X^A_{(p, T)}$ represents a contribution to $X_{(p, T)}$ of a set A of activities scheduled so far and wherein the plan modeling step is carried out with an additional constraint of a defined upper bound of $X_{(p, T)} > X^A_{(p, T)}$.

28. The computer system of claim 27, wherein if at any point $X^A_{(p, T)} \geq X^0_{(p, T)}$, the computer system carries out:

a backtracking step wherein a last process p in the schedule is unscheduled until $X^0_{(p, T)} \geq X^A_{(p, T)}$, or an updating step to update $X^0_{(p, T)}$ to obtain $X^{new}_{(p, T)}$ and to determine whether $X^{new}_{(p, T)} \geq X^A_{(p, T)}$ holds true.

29. A machine-readable medium having data stored thereon representing sequences of instructions which, when executed by computing device, causes said computing device to model a plan by performing the steps of:

defining a planning process cycle decision variable $X_{(p, T)}$ to represent an amount of a process p used during a time bucket T;

defining an energy per cycle variable $EPC_{(p, r)}$ to represent an amount of energy of a resource used by the process p;

defining a maximum energy $E_{max(r,\ T)}$ variable to represent a maximum energy of the resource r that can be used during a single time bucket T, and maintaining a constraint on a product of the $X_{(p,\ T)}$ variable and the $EPC_{(p,\ r)}$ variable, summed over the process p, to be less than or equal to $E_{max(r,\ T)}$.

30. The medium of claim 29, wherein, the energy per cycle variable $EPC_{(p,\ r)}$ is constant for a given process p and resource r.

31. The medium of claim 29, wherein the process p produces or consumes items i and wherein a product of $X_{(p,\ T)}$ and a quantity of items i produced or consumed by process p is equal to a quantity of item i produced or consumed by process p during time bucket T.

32. A machine-readable medium having data stored thereon representing sequences of instructions which, when executed by computing device, causes said computing device to model a schedule by performing the steps of:

defining a scheduling process cycle decision variable $X_a$ to represent an amount of cycles used by an activity a;

defining an energy per cycle variable $EPC_{p(a),\ r}$ to represent an amount of energy per cycle expended by a process p used by the activity a of a resource r;

defining an energy $E_{a,\ r}$ variable to represent the energy that the activity a uses of the resource r, and maintaining equality of the $E_{a,\ r}$ variable and a product of the $X_a$ variable and the $EPC_{p(a),\ r}$ variable for all resource r.

33. The medium of claim 32, wherein, the energy per cycle variable $EPC_{p(a),\ r}$ is constant for the activity a used the process p and resource r.

34. The method of claim 32, wherein the process p used by activity a produces or consumes items i and wherein a product of $X_a$ and a quantity of items i produced or consumed per cycle by the process p used by the activity a is equal to a quantity of item i produced or consumed by process p used by activity a.

35. A machine-readable medium having data stored thereon representing sequences of instructions which, when executed by computing device, causes said computing device to communicate between a plan and a schedule by performing the steps of:

modeling the plan by defining a planning process cycle decision variable $X_{(p,\ T)}$ to represent an amount of a process p used during a time bucket T such that a product of an energy per cycle variable $EPC_{(p,\ r)}$ representing an amount of energy of a resource used by the process p and the $X_{(p,\ T)}$ variable, summed over the process p, is less than or equal to a maximum energy $E_{max(r,\ T)}$ variable that represents a maximum energy of the resource r that can be used during a single time bucket T;

modeling the schedule by defining a scheduling process cycle decision variable $X_a$ to represent an amount of cycles used by an activity a such that a product of an energy per cycle variable $EPC_{p(a),\ r}$ representing an amount of energy per cycle expended by a process p used by the activity a of a resource r, over all resource r, is equal to an energy $E_{a,\ r}$ variable that represents the energy that the activity a uses of the resource r, and attempting to maintain equality between a value of $X_{(p,\ T)}$ and a value of $X_a$ that occurs during a time bucket T, summed across all time buckets T and across all activities a that use the process p.

36. The medium of claim 35, wherein a value of $X_a$ that occurs during the time bucket T is a product of $X_a$ and $d(T \cap a)/d(a)$.

37. The medium of claim 35, wherein $X^0_{(p,\ T)}$ represents a recommendation from the planning model and $X^A_{(p,\ T)}$ represents a contribution to $X_{(p,\ T)}$ of a set A of activities scheduled so far and wherein the medium is configured to cause the computing device to carry out a step of selecting a next process p to schedule based upon the recommendation $X^0_{(p,\ T)}$, the selected next process p maximizing a difference between a value of the $X^0_{(p,\ T)}$ variable and a value of the $X^A_{(p,\ T)}$ variable.

38. The medium of claim 35, wherein $X^0_{(p,\ T)}$ represents a recommendation from the planning model, $X^A_{(p,\ T)}$ represents a contribution to $X_{(p,\ T)}$ of a set A of activities scheduled so far, slack variable $X^R_{(p,\ T)}$ is defined as a difference between $X^0_{(p,\ T)}$ and $X^A_{(p,\ T)}$, and $X^R_{(p,\ T)}(K)$ is a sum of the slack variables $X^R_{(p,\ T)}$ over a number K of time buckets, and wherein the medium is configured to cause the computing device to select a next process to schedule so as to minimize a number K(p) that is defined such that $X^R_{(p,\ T)}(K-1) \leq Q_{i,\ t}/QPC_{(p,\ t)} \leq X^R_{(p,\ T)}(K)$ is true.

39. The medium of claim 35, wherein $X^0_{(p,\ T)}$ represents a recommendation from the planning model, and wherein the medium is configured to cause the computing device to carry out a step of selecting a next activity a that uses process p by attempting to schedule each process p and independently scheduling activity a that corresponds to the attempted scheduled process p and by selecting the attempted scheduled process p or activity a that that does not exceed $X^0_{(p,\ T)}$ and has a minimum duration.

40. The method of claim 35, wherein $X^0_{(p,\ T)}$ represents a recommendation from the planning model and wherein the medium is configured to cause the computing device to carry out a step of updating $X^0_{(p,\ T)}$ to obtain $X^{new}_{(p,\ T)}$ and to use $X^{new}_{(p,\ T)}$ instead of $X^0_{(p,\ T)}$ when $X^A_{(p,\ T)} > X^0_{(p,\ T)}$ for some (p, T).

41. The method of claim 40, wherein $X^A_{(p,\ T)}$ represents a contribution to $X_{(p,\ T)}$ of a set A of activities scheduled so far and wherein the plan modeling step is carried out with an additional constraint of a defined upper bound of $X_{(p,\ T)}$ ba$>X^A_{(p,\ T)}$.

42. The medium of claim 41, wherein if at any point $X^A_{(p,\ T)} \geq X^0_{(p,\ T)}$, the medium is configured to cause the computing device to carry out:

a backtracking step wherein a last process p in the schedule is unscheduled until $X^0_{(p,\ T)} \geq X^A_{(p,\ T)}$, or an updating step to update $X^0_{(p,\ T)}$ to obtain $X^{new}_{(p,\ T)}$ and to determine whether $X^{new}_{(p,\ T)} \geq X^A_{(p,\ T)}$ holds true.

* * * * *

UNITED STATES PATENT AND TRADEMARK OFFICE
CERTIFICATE OF CORRECTION

PATENT NO. : 6,912,518 B1
DATED : June 28, 2005
INVENTOR(S) : Moll

It is certified that error appears in the above-identified patent and that said Letters Patent is hereby corrected as shown below:

Column 16,
Line 49, replace "$X_{(p,T)}ba>X^A_{(p,T)}$" with -- $X_{(p,T)}>X^A_{(p,T)}$ --.
Line 51, replace "$X_{A(p,T)}\geq X°_{(p,T)}$" with -- $X^A_{(p,T)}\geq X°_{(p,T)}$ --.

Signed and Sealed this

Twenty-seventh Day of December, 2005

JON W. DUDAS
*Director of the United States Patent and Trademark Office*